US011912015B2

(12) United States Patent
La Vos et al.

(10) Patent No.: US 11,912,015 B2
(45) Date of Patent: Feb. 27, 2024

(54) SCANNING INKJET PRINTER

(71) Applicant: Canon Production Printing Holding B.V., Venlo (NL)

(72) Inventors: Peter G. La Vos, Venlo (NL); Adrianus A. Draad, Venlo (NL); Hendrikus G. M. Ramackers, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 128 days.

(21) Appl. No.: 17/349,385

(22) Filed: Jun. 16, 2021

(65) Prior Publication Data

US 2021/0402806 A1 Dec. 30, 2021

(30) Foreign Application Priority Data

Jun. 30, 2020 (EP) .................................... 20183271

(51) Int. Cl.
*B41J 11/00* (2006.01)
*B41J 13/00* (2006.01)
*B41J 2/01* (2006.01)

(52) U.S. Cl.
CPC ............. *B41J 11/0022* (2021.01); *B41J 2/01* (2013.01); *B41J 11/007* (2013.01); *B41J 11/0045* (2013.01); *B41J 13/0036* (2013.01)

(58) Field of Classification Search
CPC ... B41J 11/0022; B41J 11/0045; B41J 11/007; B41J 13/0036; B41J 2/01
See application file for complete search history.

(56) References Cited

U.S. PATENT DOCUMENTS

| | | | | |
|---|---|---|---|---|
| 2013/0156473 A1* | 6/2013 | Boesten | G03G 21/203 | 399/320 |
| 2016/0152045 A1* | 6/2016 | La Vos | B65H 29/56 | 271/3.21 |
| 2016/0152429 A1* | 6/2016 | La Vos | B65H 5/228 | 271/225 |
| 2019/0283470 A1* | 9/2019 | Okayama | B41J 13/106 | |

FOREIGN PATENT DOCUMENTS

| | | | | |
|---|---|---|---|---|
| EP | 3 224 167 | B1 | | 10/2018 |
| JP | 9-142429 | A | | 6/1997 |
| JP | 2002-128038 | A | | 5/2002 |
| JP | 3770640 | B2 | * | 4/2006 |
| JP | 2006334943 | A | * | 12/2006 |
| JP | 2009160886 | A | * | 7/2009 |
| JP | 2010083599 | A | * | 4/2010 |

OTHER PUBLICATIONS

Search Report issued in European priority application 20183271 dated Dec. 14, 2020.

* cited by examiner

*Primary Examiner* — Justin Seo
*Assistant Examiner* — Kendrick X Liu
(74) *Attorney, Agent, or Firm* — Birch, Stewart, Kolasch & Birch, LLP

(57) ABSTRACT

An air knife assembly is provided to jet an air current to control the landing of sheet of print media during transfer between two adjacent conveyors in a printer. The air knife forming unit is configured for jetting an air curtain formed such that said air curtain and air currents resulting from it flow substantially perpendicular to a transport direction of the conveyors. Thereby, lifting and consequently wrinkling of the leading edge during transfer and landing may be avoided.

20 Claims, 3 Drawing Sheets

SCANNING INKJET PRINTER

FIELD OF THE INVENTION

The present invention generally pertains to sheet printer and a method for transferring a sheet between conveyors in such a printer.

BACKGROUND ART

A sheet printer, specifically a sheet printer for high productivity or large volumes, comprises a transport path which transports sheets from a sheet input module, such as a sheet feeder, along a print station for deposition of an image on said sheet, to a sheet output module, for example a sheet stacker. The transport path generally comprises a plurality of conveyors, such as transport pinches and conveyor belts. A conveyor belt allows the sheet to be adhered flatly to its sheet support surface by means of an underpressure applied through the belt to the sheet. Also, the sheet is transported without contacting one of its faces, which allows it be transported while the image has not yet been fully fixed to the sheet. For those reasons belt conveyors may be applied at or near the print station. When a belt conveyor receives a sheet from an upstream conveyor, a controlled landing of the sheet on the belt conveyor is desired to avoid deforming the sheet. An air knife forming unit may be used to control the landing of the sheet, specifically for preventing the leading edge of the sheet from curling and/or wrinkling. Such an air knife forming unit is known for example from EP 3224167 B1. EP 3224167 B1 proposes further controlling the landing of the sheet by controlling the underpressure applied to the leading edge of the sheet as it lands on the belt conveyor.

SUMMARY OF THE INVENTION

It is an object of the present invention to provide an air knife assembly to assist in the transfer of sheets, wherein the chance of deforming the leading edge during landing is reduced. The present invention seeks to provide an alternative solution to EP 3224167 B1, which solution preferably requires less components, costs, and/or space.

Thereto, the present invention relates to a sheet printer comprising:

- an upstream and a downstream sheet conveyor adjacent to one another in a transport direction of a sheet on said conveyors and defining a transfer region wherein a sheet is transferred between said conveyors,
- an air knife assembly positioned in the transfer region for emitting an air current to control the landing of an edge of said sheet on the downstream conveyor, wherein the air knife assembly is configured for emitting an air curtain formed such that said air curtain and air currents resulting from it flow substantially perpendicular to said transport direction.

The insight of the inventors is illustrated in FIG. 3A to FIG. 4B. The inventors found, as shown in FIG. 3A-B, that a lateral air curtain 74' as applied in the prior art, results in an air flow 75' in the transport direction X. The resulting air flow 75' is drawn as a vortex 75', but may also be a more directional type of air flow. This resulting air flow 75' creates a local underpressure above the leading edge of the sheet 41 as a consequence of the Bernoulli principle. This underpressure may cause the leading edge to become locally lifted, preventing the leading edge from adhering flatly to the downstream conveyor. Additional effects, such as the air flow 75' flowing underneath the leading edge to lift it, may further occur. Additionally, similar issues may occur at the trailing edge of the sheet, though deformation issues generally extend further into the sheet due to the continuous movement of the sheet in the transport direction during transfer.

It is the further insight of the inventors that the above issues may be avoided if the respective air current and air flows are directed substantially perpendicular to the transport direction. When, for example, an air curtain 74, 76 which is longitudinal in the transport direction and perpendicular to said transport direction X is applied, as shown in FIG. 4A-B, the resulting air flows 75, 77 are directed laterally towards the side edges of the sheet 41. The Bernoulli forces on the leading edge are much reduced as compared to FIG. 3A-B, since the air flow 75, 77 is not directed to flow over the leading in transport direction X. As such an air knife assembly is provided which allows for a controlled landing of the leading edge of the sheet by applying an air flow, without said air flow resulting in a deformation of the leading edge on the downstream conveyor.

Further advantageous embodiments are subject of the dependent claims.

It will be appreciated that substantially perpendicular may comprise the majority of the air flows being directed perpendicular to the transport direction. A small or minor portion of the air current and/or the resulting air flows may be directed non-perpendicular to the transport direction. Said portion is however significantly less (for example less than 20%) than the amount of air flowing perpendicular to the transport direction in terms of velocity and/or volumetric rates. The majority of the air current is aimed to flow perpendicular to the transport direction, as well to direct the resulting air flows perpendicular to the transport direction.

In an embodiment, the air knife assembly is configured for emitting an air curtain substantially longitudinal in said transport direction. The air curtain as emitted by the air knife assembly extends longitudinally in the transport direction. The air curtain when viewed perpendicular to a sheet support plane of the downstream conveyor is substantially parallel to or at a small angle (for example between 0 and 30°) with respect to the transport direction. Preferably, in said view the air curtain is substantially straight, though it may comprise minor bending.

In an embodiment, the air knife assembly is configured for emitting at least two laterally spaced apart air curtains which extend longitudinally in said transport direction. The air knife assembly preferably comprises a first and a second air knife forming unit at different lateral positions. Each air knife forming unit is configured for jetting an air curtain, preferably synchronously with one another. In an advantageous embodiment, the first and second air knife forming units are positioned symmetrically with respect to a center or central plane of the downstream conveyor and/or or the sheet, for example offset at the same spacing with respect to a central line of the conveyor in the transport direction. Using two air curtains provides added control over the air flow.

In an embodiment, the air knife assembly comprises an elongated air knife forming unit which extends substantially longitudinally in said transport direction. The air curtain is formed and determined by the air knife forming unit. Preferably, the air knife forming unit is formed of a row of nozzles extending substantially in said transport direction, though a single elongated nozzle may be applied within the present invention. The nozzles are preferably spaced sufficiently adjacent to create a substantially continuous air curtain.

In an embodiment, said air knife assembly comprises two air knife forming units, each formed of a row of nozzles extending substantially in said transport direction. The air knife assembly comprises two rows of nozzles which extend in the transport direction and are laterally spaced apart from one another. Each row of nozzles is configured for forming an air curtain. Pressurized gas is provided to the rows of nozzles, preferably such that both air curtains are formed simultaneously and mirror-symmetrically with respect to a central plane passing through a center of the downstream conveyor or the sheet.

In an embodiment, the nozzles of each row are aimed at an angle with respect to an out-of-plane direction of a sheet support surface of said conveyors, and wherein each row of nozzles is angled towards its respective adjacent lateral side of said conveyors. The air flow generated by the nozzles is directed sideways towards the nearest lateral edges of the conveyors. Thereby, the majority of the air flow from the row of nozzles is directed to the adjacent lateral edge of the conveyor, while a smaller portion passes towards the center and/or remote lateral edge of the downstream conveyor. When two air knife forming units are positioned as such, the majority of the generated air flow is thus directed laterally towards the closest outer sides of the conveyor. In the region in between the air knife forming units (when viewed from above) the resulting air flows from the first and second air knife forming units may substantially cancel each other out in the lateral direction, as a consequence of the mirror-symmetric positioning of the air knife forming units in another embodiment. The Bernoulli forces in the central region may thus be relatively small, while the sheet in said region is pressed firmly downward by the combined air flows.

In an embodiment, the air knife assembly extends from and over an upstream end of said downstream conveyor to and over a downstream end of said upstream conveyor. The air knife assembly, specifically the air knife forming unit and its generated air curtain, extends over the length of the transfer region in the transport direction. The generated air curtain covers the last end of the upstream and the first end of the downstream conveyor as well as the gap intermediate the conveyors in the transport direction. Preferably, the jetting of the air curtains is timed with the arrival of the leading edge at the downstream conveyor. Allowing the air knife assembly to extend across the transfer region allows for an effective pressing down on the sheet, especially compared to a lateral air knife forming unit pressing only very locally on the leading edge.

In an embodiment, a sheet drying station is positioned over the downstream conveyor, said drying station comprising an air blower for supplying pressurized air, wherein the air knife assembly is supplied by said air blower. The sheet drying station comprises one or more air nozzles for applying a drying and/or heating air flow to the sheet. Pressurized gas is supplied to the nozzles of the drying station by means of an air blower. Said blower may further be connected to the air knife assembly to supply pressurized gas to the air knife assembly. The first conveyor is preferably sufficiently adjacent the sheet drying station to allow for a simple and low air resistance connection between the air blower and the air knife assembly. In another embodiment, the sheet drying station transitions into the air knife assembly, at least along the transport direction. The air knife forming unit may thus be formed from similar or the same components as the sheet drying station, reducing the overall costs of the printer.

In an embodiment, the sheet drying station is generally positioned downstream or adjacent the print station, which comprises the upstream conveyor. The sheet is printed while on the upstream conveyor and transferred to the downstream conveyor, which is comprised in the sheet drying station. This results in a very compact embodiment, wherein the sheet may be dried rapidly after printing, reducing the chance of print artifacts due to a relative long exposure of the sheet to wet ink.

In an embodiment, the drying station comprises an impingement dryer which comprises a plurality of nozzles of emitting high velocity air jets, wherein the impingement dryer extends towards the transfer region where it transitions into the air knife assembly. Impingement drying of sheets is an efficient method of drying printed sheets. The high velocity nozzles and suitable air blower for supplying pressurized gas of impingement dryer may be shared and/or utilized in the air knife assembly. This allows for costs reduction as similar and/or less components may be used. Also, the air knife assembly may be formed as an extension of the sheet drying station, resulting in a space efficient design. The transitioning may be achieved by mounting a support for the air knife assembly on the support for the impingement dryer, or a single support may be shared between the impingement dryer and the air knife assembly.

In an embodiment, said upstream conveyor and/or said downstream conveyor comprises an air-permeable endless belt positioned over a suction chamber through which an underpressure is applicable for holding sheets against said endless belt. The respective conveyor holds the sheet flatly against the belt by suction applied to the sheet through the belt. The suction chamber is connected to a suction source for drawing in air through the belt and the suction chamber. The endless belt is suspended on at least two rollers, one which is provided with a motor for rotating said roller and thereby moving the belt.

In an embodiment, the sheet printer according to the present invention further comprises a controller for controlling the air knife assembly to emit the air current timed to an arrival of a sheet in the transfer region. The air knife assembly is controlled for intermittently jetting air curtains, for example by means of a valve controlled by the controller. The air curtains are applied as the leading edge of the sheet arrives at the downstream conveyor. The air curtains are therein preferably applied along the length of the transfer region to provide a sufficient pressing force on the sheet. The timing may be varied dependent on the requirements of the print media type applied.

In an embodiment, the air knife assembly is positioned over and facing a sheet support surface of said conveyors. The air knife assembly is during operation position above the conveyors.

The invention further relates to a method for transferring a sheet between a downstream conveyor positioned to receive a sheet from an upstream conveyor, comprising the step of applying an air current to the sheet as it is transferred between said conveyors, characterized by the air current extending substantially longitudinal in a transport direction of said conveyors. The air current may be applied as described above.

Additionally, the present invention may further relate to a sheet conveyor assembly for transporting a sheet in a transport direction along a print station for printing an image on said sheet and along a detector downstream of said print station for inspecting said printed sheet, wherein an air blowing assembly is provided downstream of the detector for generating an air current between the conveyor assembly and detector which air current flows upstream against the transport direction. This configuration has the advantage to provide reliable inspection of printed images in a sheet printer, especially during prolonged operation. In an advantageous embodiment, the air knife assembly may be embodied in the air blowing assembly of said printer, though as will be explained below the object of said printer may also be achieved with a different air blowing assembly, such as a sheet drying station.

It was found that the reduced reliability of the detector was a consequence of particulates contaminating the surface of the detector facing the sheet. The particulates were found to originate from the print station, where a fine ink mist is generated during the jetting of the ink jet print heads. It was further found that particulates from this ink mist traveled in the transport direction of the sheets towards the detector. At the detector the particulates would adhere to the sensor surface of the detector, providing spots in the image data, which did not correspond to the printed image. This resulted in erroneous conclusion and/or results as to the quality of the printed image. This in turn resulting in unnecessary downtime of the printer as cleaning of the detector was required.

The present invention prevents the particulates from the ink mist from substantially reaching the detector by providing an air flow opposite to the transport direction. The air flow flows from the air blowing assembly along the detector towards the print station and forms an effective barrier against ink particulates originating from the print heads. As such, ink contamination of the detector is reduced or even prevented, resulting in a prolonged reliable operation of the detector.

In an embodiment, the print station is connected to a suction system for drawing air from the print station, said suction system comprising a filter and being connected to the air blowing assembly, such that filtered air is supplied from the suction system to the air blowing assembly. The upstream air flow should be free of ink particulates. A similar requirement is generally or often placed on the surroundings of the printer. Thereto the printer is provided with a suction system connected to a filter for withdrawing and filtering air from the print station, such that said filtered air may be vented to the ambient of the printer. The same suction system and filter may be applied for providing ink-free air to the air blowing assembly, resulting in a compact and low-cost embodiment.

In an embodiment, the air blowing assembly is positioned sufficiently adjacent the detector, such that its generated local overpressure in combination with a local underpressure applied by the suction system at the print station results in the upstream air flow. The air flow is formed due to the pressure gradient between the overpressure provided by the air blowing assembly and the relative underpressure at the print station due to the suction system. Underpressure and overpressure herein being relative terms dependent on the operating conditions of the printer, which are generally at atmospheric pressure. Preferably, the air blowing assembly is directly downstream of the detector.

In an embodiment, the print station comprises plurality of ink jet print heads for generating ink droplets, an wherein the upstream air flow substantially prevents ink particulates from the ink jet print heads from reaching and covering the detector. The air flow between the air blowing assembly and the print station and/or its suction system is sufficiently large and/or strong to prevent ink particulates to travel from the print region below the print station onto the detector. In another embodiment, operation of the print heads results in an ink mist at least between the conveyor assembly and the print station, which ink mist is substantially prevented from reaching the detector by the upstream air flow. The ink mist is formed of very fine droplets or particulates created during the jetting of the ink droplets intended to form the image on the sheet. The ink particulates may be sufficiently small to be less affected by gravity, allowing these particulates to travel relatively far in the transport direction. The upstream air flow provides a convective flow which will return particulates to the print station and/or forms a pressure front beyond which the particulates substantially do not pass.

In an embodiment, the print heads during operation extend stationary over a majority of the width of the conveyor assembly. This allows the conveyor assembly to transport the sheet along the print station without stopping during printing. The sheets thus travel with a relatively high speed along the print station, which could create an air flow in the transport direction and bring particulates onto the detector. It should be noted that the print gap between such a pagewide print head array and the conveyor assembly is relatively small to allow for accurate positioning of the ink droplets on the sheets. This is avoided by the air blowing assembly providing a sufficiently large air flow and/or overpressure, such that the air flow beneath the detector is substantially opposite to the transport direction.

In an embodiment, the air blowing assembly comprises an air knife assembly positioned in a transfer region between upstream and downstream conveyors of the conveyor assembly for emitting an air current to control the landing of an edge of said sheet on the downstream conveyor, wherein the air knife assembly is positioned adjacent the detector. In another embodiment, the air blowing assembly comprises a sheet drying station comprising a plurality of nozzles for blowing air towards the sheet for drying an image printed on said sheet, wherein the sheet drying station is positioned adjacent the detector. Specifically, the sheet drying station may in another embodiment formed by an impingement dryer for delivering jets of high velocity air onto the sheet to provide fast and efficient drying of the printed sheets.

The present invention further relates to a method for ink jet printing of sheets, comprising the steps of:

- conveying a sheet along a print station for jetting an image on said sheet;
- drawing in air from the print station, filtering said air, and providing said air to an air blowing assembly positioned downstream of a detector which detector is positioned downstream of the print station for inspecting sheets printed by the print station; and
- generating an air flow which flows from the air blowing assembly substantially upstream against the transport direction underneath the detector towards the print station. To generate the air flow an air blowing assembly may be provided downstream of the detector. At least a portion of the air emitted from the air blowing assembly is directed underneath and along the detector, for example by applying a suitable pressure gradient and/or directional air flow. The generated air flow is sufficiently large, fast and/or or strong, such that it substantially prevents ink particulates originating from the print station from reaching the detector. Thus, the detector remains clean during operation which allows for accurate sensing to ensure print quality and in consequence also a highly productive printing process.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematical drawings which are given by way of illustration only, and thus are not limitative of the present invention, and wherein.

DETAILED DESCRIPTION OF THE DRAWINGS

Figure 1:
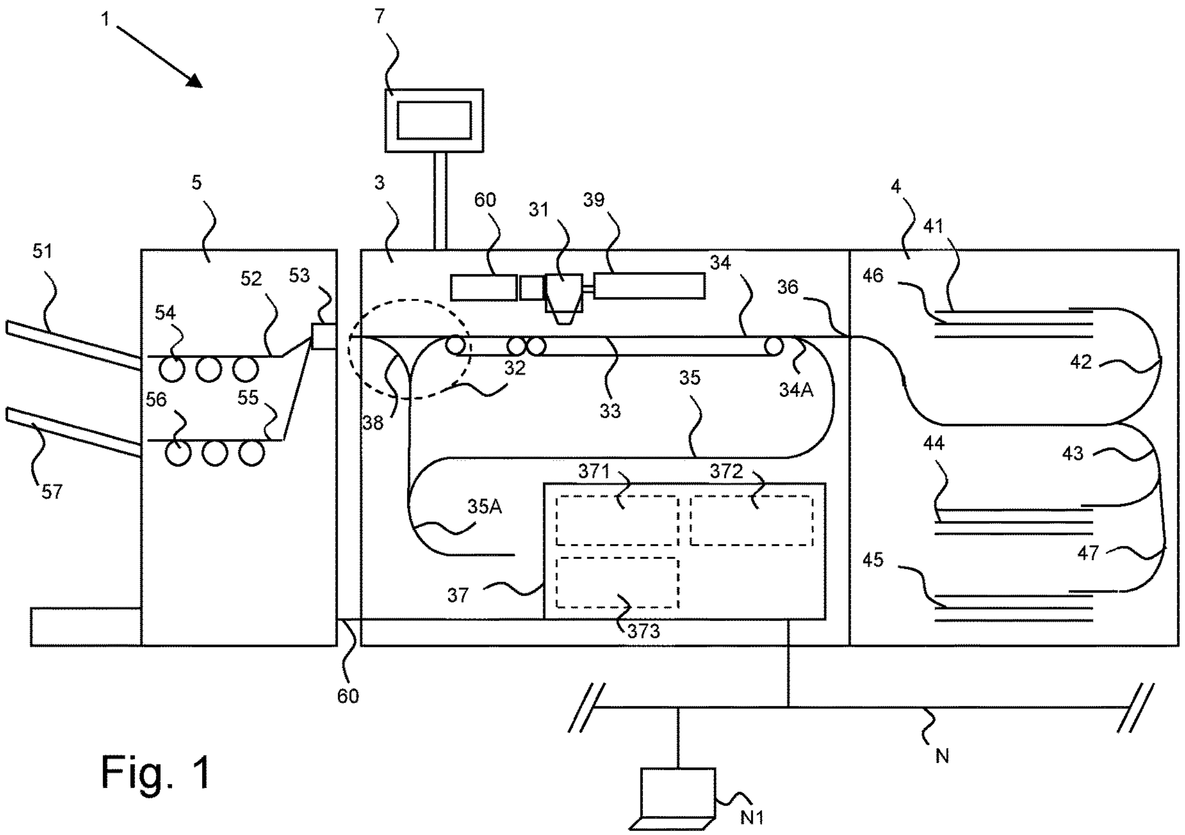
FIG. 1 is a schematic cross-sectional side view of a sheet printer according to the present invention.

The present invention will now be described with reference to the accompanying drawings, wherein the same reference numerals have been used to identify the same or similar elements throughout the several views.

FIG. 1 shows schematically an embodiment of a printer 1 according to the present invention. The printer 1, for purposes of explanation, is divided into an output section 5, a print engine and control section 3, a local user interface 7 and an input section 4. While a specific printer is shown and described, the disclosed embodiments may be used with other types of printer such as an ink jet print system, an electrographic print system, etc.

The output section 5 comprises a first output holder 52 for holding printed image receiving material, for example a plurality of sheets. The output section 5 may comprise a second output holder 55. While 2 output holders are illustrated in FIG. 1, the number of output holders may include one, two, three or more output holders. The printed image receiving material is transported from the print engine and control section 3 via an inlet 53 to the output section 5. When a stack ejection command is invoked by the controller 37 for the first output holder 52, first guiding means 54 are activated in order to eject the plurality of sheets in the first output holder 52 outwards to a first external output holder 51. When a stack ejection command is invoked by the controller 37 for the second output holder 55, second guiding means 56 are activated in order to eject the plurality of sheets in the second output holder 55 outwards to a second external output holder 57.

The output section 5 is digitally connected by means of a cable 60 to the print engine and control section 3 for bi-directional data signal transfer.

The print engine and control section 3 comprises a print engine and a controller 37 for controlling the printing process and scheduling the plurality of sheets in a printing order before they are separated from input holder 44, 45, 46.

The controller 37 is a computer, a server or a workstation, connected to the print engine and connected to the digital environment of the printer, for example a network N for transmitting a submitted print job to the printer 1. In FIG. 1 the controller 37 is positioned inside the print engine and control section 3, but the controller 37 may also be at least partially positioned outside the print engine and control section 3 in connection with the network N in a workstation N1.

The controller 37 comprises a print job receiving section 371 permitting a user to submit a print job to the printer 1, the print job comprising image data to be printed and a plurality of print job settings. The controller 37 comprises a print job queue section 372 comprising a print job queue for print jobs submitted to the printer 1 and scheduled to be printed. The controller 37 comprises a sheet scheduling section 373 for determining for each of the plurality of sheets of the print jobs in the print job queue an entrance time in the paper path of the print engine and control section 3, especially an entrance time for the first pass and an entrance time for the second pass in the loop in the paper path according to the present invention. The sheet scheduling section 373 will also be called scheduler 373 hereinafter.

The sheet scheduling section 373 takes the length of the loop into account. The length of the loop corresponds to a loop time duration of a sheet going through the loop dependent on the velocity of the sheets in the loop. The loop time duration may vary per kind of sheet, i.e. a sheet with different media properties.

Resources may be recording material located in the input section 4, marking material located in a reservoir near or in the print station 39 of the print engine, or finishing material located near the print station 39 of the print engine or located in the output section 5 (not shown).

The paper path comprises a plurality of paper path sections 32, 33, 34, 35 for transporting the image receiving material from an entry point 36 of the print engine and control section 3 along the print station 39 to the inlet 53 of the output section 5. The paper path sections 32, 33, 34, 35 form a loop according to the present invention. The loop enables the printing of a duplex print job and/or a mix-plex job, i.e. a print job comprising a mix of sheets intended to be printed partially in a simplex mode and partially in a duplex mode.

The print station 39 is suitable for ejecting and/or fixing marking material to image receiving material. The print station 39 is positioned near the paper path sections 33, 34. The print station 39 comprises an inkjet print head assembly, preferably formed as a page wide array. Downstream of the print station 39 a print quality inspection device in the form of detector 31 is provided for determining a compliance between the printed image and the input print job. The detector 31 may comprise a camera, such as a CCD or line scanner with sufficient resolution to analyze the printed image for example for the occurrence of non-jetting or deviating jetting nozzles of the print station 39. A treatment station 60 is provided downstream of the print station 39, and preferably downstream of the detector 31. The treatment station 60 is arranged for fixing the jetted ink to the image receiving. The treatment station 60 thereto may comprise heaters and/or emitters for emitting (heated) air and/or radiation for drying and/or curing the ink on the image receiving member.

While an image receiving material is transported along the paper path section 34 in a first pass in the loop, the image receiving material receives the marking material through the print station 39. A next paper path section 32 is a flip unit 32 for selecting a different subsequent paper path for simplex or duplex printing of the image receiving material. The flip unit 32 may be also used to flip a sheet of image receiving material after printing in simplex mode before the sheet leaves the print engine and control section 3 via a curved section 38 of the flip unit 32 and via the inlet 53 to the output section 5. The curved section 38 of the flip unit 32 may not be present and the turning of a simplex page has to be done via another paper path section 35.

In case of duplex printing on a sheet or when the curved section 38 is not present, the sheet is transported along the loop via paper path section 35A in order to turn the sheet for enabling printing on the other side of the sheet. The sheet is transported along the paper path section 35 until it reaches a merging point 34A at which sheets entering the paper path section 34 from the entry point 36 interweave with the sheets coming from the paper path section 35. The sheets entering the paper path section 34 from the entry point 36 are starting their first pass along the print station 39 in the loop. The sheets coming from the paper path section 35 are starting their second pass along the print station 39 in the loop. When a sheet has passed the print station 39 for the second time in the second pass, the sheet is transported to the inlet 53 of the output section 5.

The input section 4 may comprise at least one input holder 44, 45, 46 for holding the image receiving material before transporting the sheets of image receiving material to the print engine and control section 3. Sheets of image receiving material are separated from the input holders 44, 45, 46 and guided from the input holders 44, 45, 46 by guiding means 42, 43, 47 to an outlet 36 for entrance in the print engine and control section 3. Each input holder 44, 45, 46 may be used for holding a different kind of image receiving material, i.e. sheets having different media properties. While 3 input holders are illustrated in FIG. 1, the number of input holders may include one, two, three or more input holders.

The local user interface 7 is suitable for displaying user interface windows for controlling the print job queue residing in the controller 37. In another embodiment a computer N1 in the network N has a user interface for displaying and controlling the print job queue of the printer 1.

Figure 2:
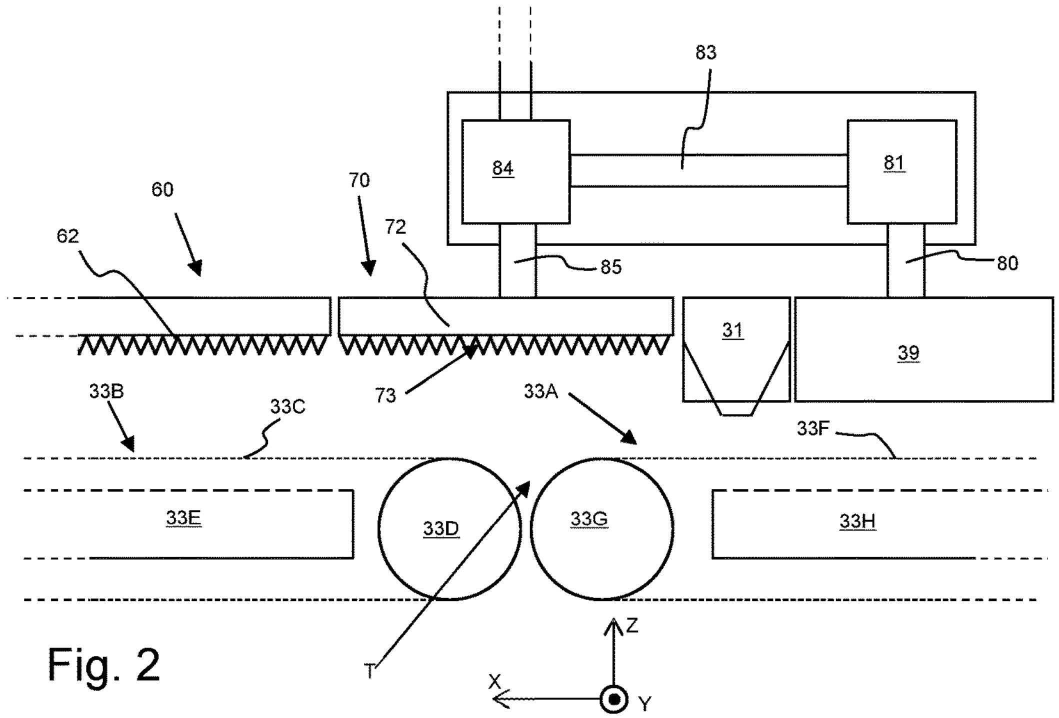
FIG. 2 is an enlarged view of the transfer region of the printer in FIG. 1.

FIG. 2 illustrates an enlarged view of the respective section of the printer 1 holding the print station 39 and the air blowing assembly 60, 70 comprising the sheet drying station 60 and the air knife assembly 70. The transport path section 33 comprises a conveyor assembly 60, 70 formed by an upstream 33A and a downstream conveyor 33B. Both conveyors 33A, 33B are formed by an endless belt 33C, 33F suspended on two or more of rollers 33D, 33G. At least one of the rollers 33D, 33G is a driving roller connected to a drive or motor for rotating the roller 33D, 33G and thereby moving the belt 33C, 33F. The sheet support surface of each belt 33C, 33F at least partially extends over a suction box or chamber 33E, 33H, which is connected to a suction source (not shown), such as a pump or fan, for creating an underpressure in the suction chamber 33E, 33H. Thereby sheets 41 are held flat against the support surface of the respective belt 33C, 33F. The downstream end of the upstream conveyor 33A, which in FIG. 2 is defined as the roller 33G, is positioned near or adjacent the upstream end of the downstream conveyor 33B, which is illustrated as the roller 33D. Sheets 41 passing in the transport direction X are transferred between the conveyors 33A, 33B in the transfer region T. The transfer of sheets 42 between conveyors 33A, 33B may be assisted by an intermediate support or bottom knife air knife forming unit to prevent the sheet 41 from deflecting downwards.

Above the transfer region T an air knife assembly 70 is provided. The air knife assembly 70 extends over the adjacent ends of the conveyors 33A, 33B as well as over the intermediate area. The air knife assembly 70 in FIG. 2 comprises at least one longitudinal air knife forming unit 72, which extends along the transfer region. The length of the air knife forming unit 72 and/or its emitted air current or curtain is significantly greater in the transport direction X than in the lateral direction Y, preferably by at least a factor of 10, 25, 50, or 100. In FIG. 2, the longitudinal air knife forming unit 70 is formed by a row of nozzles 73 which extend substantially in the transport direction X. The row of nozzles 72 may be parallel to the transport direction X or at a non-right angle with said direction X. As an alternative to the nozzles 72 in FIG. 2, the longitudinal air knife forming unit may in other embodiments be formed as a large slit or plurality of slits. It is noted that FIG. 4B illustrates that the air knife assembly 70 may comprise a plurality of longitudinal air knife forming units. Specifically, in FIG. 4B, the second air knife forming unit 71 is configured substantially mirror symmetric to the first air knife forming unit 72 with respect to a central plane of the conveyors 33A, 33B or the sheets 41 thereon, said central plane extending in the transport direction X and height direction Z.

Pressurized air is supplied to the air knife forming unit 72 to generate the air current 74. The emitted air current 74 is shaped as an air curtain 74 which is longitudinal in the transport direction X, while being relatively narrow in the lateral direction Y, at least until the current 74 contacts a sheet 41 and/or conveyors 33A, 33B. The air curtain 74 need not be continuous, though it is preferred that the jets emitted by the individual nozzles 73 overlap and/or are in close proximity when forming the air curtain 74. Preferably, the jetting of the air current 74 is timed or pulsed in accordance with the arrival of a sheet 41 in the transfer region T. To ensure a controlled landing of the sheet 41 on the downstream conveyor 33B, the air current 74 may for example be jetted as the leading edge of the sheet 41 arrives at the downstream conveyor 33B or when said leading edge leaves the upstream conveyor 33A. The nozzles 73 may be controlled to jet simultaneously, but also subsequently with a timing that matches the speed of the sheet 41, such that a leading edge of the air curtain moves at a similar speed as the leading edge. The jetting of air may be stopped after a predetermined period from the landing of the leading edge on the downstream conveyor 33B. The timing, speeds, and volumetric rates of the air currents differ per print media type and may be selected from a predetermined lookup table stored on the controller's memory.

Figure 3A:
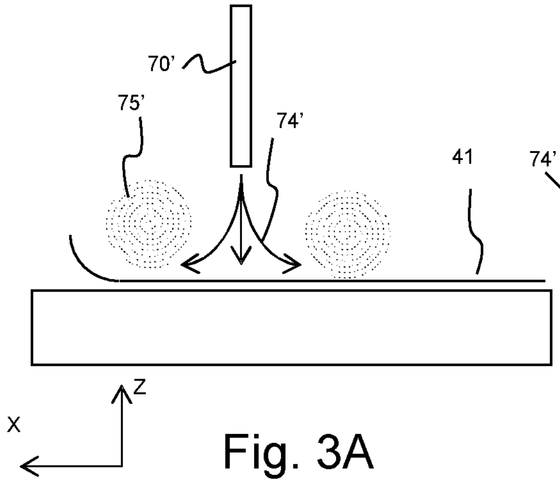
FIG. 3A is a schematic side view of an air knife assembly according to the prior art.

Downstream of the air knife assembly 70 a sheet treatment station 60 is positioned. In FIG. 2, the treatment station 60 is embodied as a drying station 60 which extends over the downstream conveyor 33B. After printing and transferring to the second conveyor 33B, the sheet 41 is dried by the drying station 70. If the sheet 41 is not correctly transferred to the downstream conveyor 33B, the sheet 41 may not be spread flatly onto the second conveyor 33B. This in turn may result in wrinkles in the just printed sheet 41, which wrinkles may become permanent deformations if the printed sheet 41 is dried while in said deformed state. Hence, it is known to assist in the landing of the leading edge of the sheet 41 on the downstream conveyor 33B by means of an air knife forming unit. FIG. 3A illustrates an exaggerated side view of a known air knife forming unit 70'. The known air knife forming unit 70' extends laterally in the respective direction Y and is positioned near or at the upstream end of the downstream conveyor. As the sheet 41 arrives at the downstream conveyor an air curtain 75' is jetted by the air knife forming unit 70' onto the leading edge of the sheet 41. While this air curtain 75' initially provides a downward force on the sheet 41, it further results in an air flow 75' in the transport direction X. In FIG. 3A this resulting air flow 75' is illustrated as a vortex, though it may also be more directional outflow of air in the transport direction X. This resulting air flow near the leading edge results in local reduction in static pressure in accordance with Bernoulli's principle. This local pressure reduction can result in an upward force which locally releases the leading edge of the sheet 41 from the downstream conveyor or prevents it from landing properly. This is illustrated in the front view in FIG. 3B. In consequence the sheet 41 may become positioned non-flatly on the downstream conveyor. As the sheet is transferred with continuous motion, the resulting wrinkles may extends over significant length of the sheet 41 in the transport direction X. If the sheet 41 is dried on the downstream conveyor 33B by a drying station 60, these wrinkles may be fixed permanently into the sheet, which could result in visible print artifact and/or paper jams due to the sheet becoming unsuited for further transport.

Figure 3B:
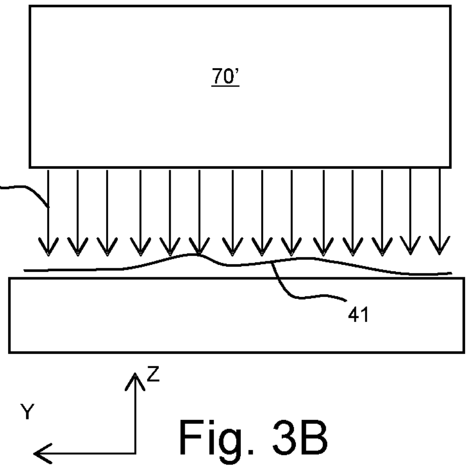
FIG. 3B is a schematic front view of the air knife assembly of FIG. 3A.
Figure 4A:
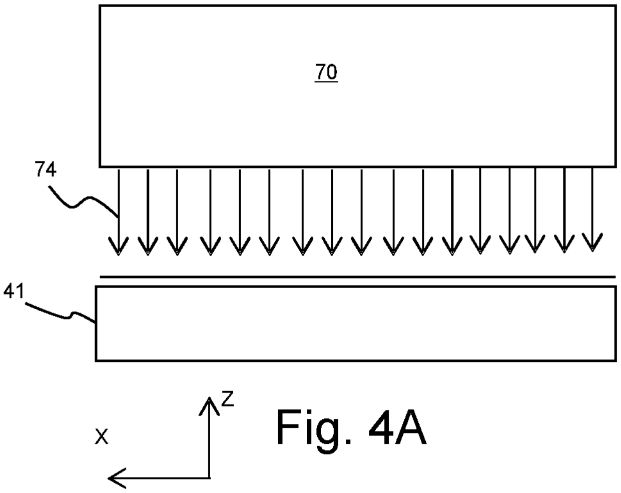
FIG. 4A is a schematic side view of an air knife assembly according to the present invention.
Figure 4B:
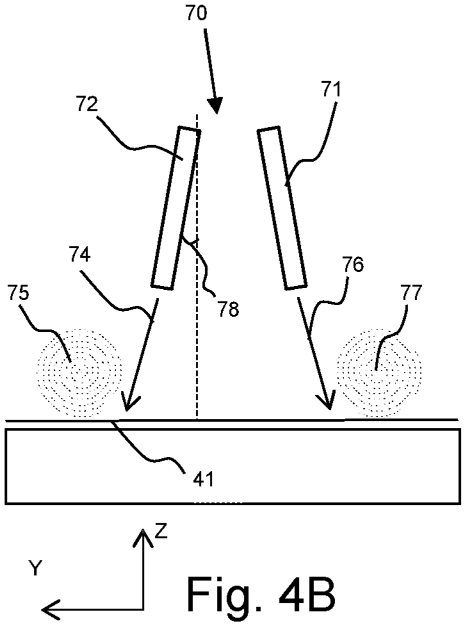
FIG. 4B is a schematic front view of the air knife assembly of FIG. 4A.

In the present invention, the air knife assembly 70 extends longitudinally in the transport direction X, as illustrated in FIG. 4A. This reduces or even eliminates the above described Bernoulli-related effects, as shown in FIG. 3A, 3B. FIG. 4B illustrates a pair of air knife forming units 71, 72 which are positioned mirror-symmetrically with respect to a central plane of the sheet 41 or conveyors 33A, 33B. Both air knife forming units 71, 72 are oriented at a small angle 78, which directs the jetted air curtains 74, 76 at least slightly towards the outer lateral edges of the sheet 41. The resulting air flows 75, 77 move substantially in the lateral direction Y. Again, the air flows 75, 77 are illustrated as vortices for illustrative purposes, but may be any of any form. Since the air knife forming units 71, 72 are positioned mirror-symmetrically, the effective air flow velocity of air on the sheet 41 in between the air knife forming units 71, 72 (when viewed from above in the height direction Z) is low or even zero. In this in-between area, the air flow of one air knife forming unit 71 opposes and/or cancels out the air flow of the other air knife forming unit 72 at least in the transport direction X. During transfer, a central region of an upward curling leading edge of a sheet 41 is thereby pressed down first against the downstream conveyor, as compared to the rest sheet 41. The outer edges of the sheet 41 follow the central region, which results in a creasing motion which may smoothen out wrinkles towards and beyond the lateral sides of the sheet 41. This provides an additional smoothening or flattening of the sheet 41. The air knife forming units 71, 72 are positioned over a central region of the sheet 41 (and/or the downstream conveyor), spaced apart from the lateral edges to achieve this creasing effect.

As shown in FIG. 2, the drying station 60 may comprise a plurality of high velocity nozzles 62 for so-called impingement drying. Therein, air is jetted from several nozzles 62 at sufficiently high velocities to contact the wet sheet 41 and afterwards circulated back to the drying station 60. Preferably, the air is hot and/or dry. Since the drying station 60 as well as the air knife assembly 70 comprises air nozzles 62, 73, the two may be combined in an advantageous and space-efficient embodiment. In FIG. 2, the drying station 60 is adjacent the air knife assembly 73. This allows the air knife assembly 70 to be formed as an extension of the drying station 60 in the upstream against the transport direction X. The air knife assembly 70 may be formed of similar components (e.g. nozzles 62, 73) as the drying station 60 and certain components, such as a pressure source, may be shared between the drying station 60 and the air knife assembly 70.

As shown in FIG. 2 a part or portion of the air supplied to the air knife assembly 70 is recycled from the print station 39. The print station 39 in FIG. 2 comprises a page-wide print head assembly 39. The print heads of the print station 39 during operation jet fine droplets of in onto the sheets on the upstream conveyor 33A to form an image thereon.

The page-wide print head array ensures high productivity as the sheets 41 may continue moving on the conveyor 33A during printing. Further, the conveyor 33A holds the sheet flat against the belt 33F during printing, reducing the risk of print artifacts from occurring. Additionally, a print quality detector 31 is positioned over the same conveyor 33A as over which the print station 39 is positioned. The printed image is thereby inspected after printing for the occurrence of print defects, for example due to the failing of print head nozzles. The detector 31 is positioned between the air knife assembly 70 and the print station 39. The detector 31 is preferably an optical detector 31, such as a camera or line scanner, which acquires an image from the printed sheet 41. The acquired image is converted to data which is compared to previously stored image date (which may be a test pattern or image data defining the printed image). As such any defects in the printed image may be de identified and appropriate actions may be scheduled, such as reprinting, print head cleaning, issuing operator notifications, etc.

Figure 5:
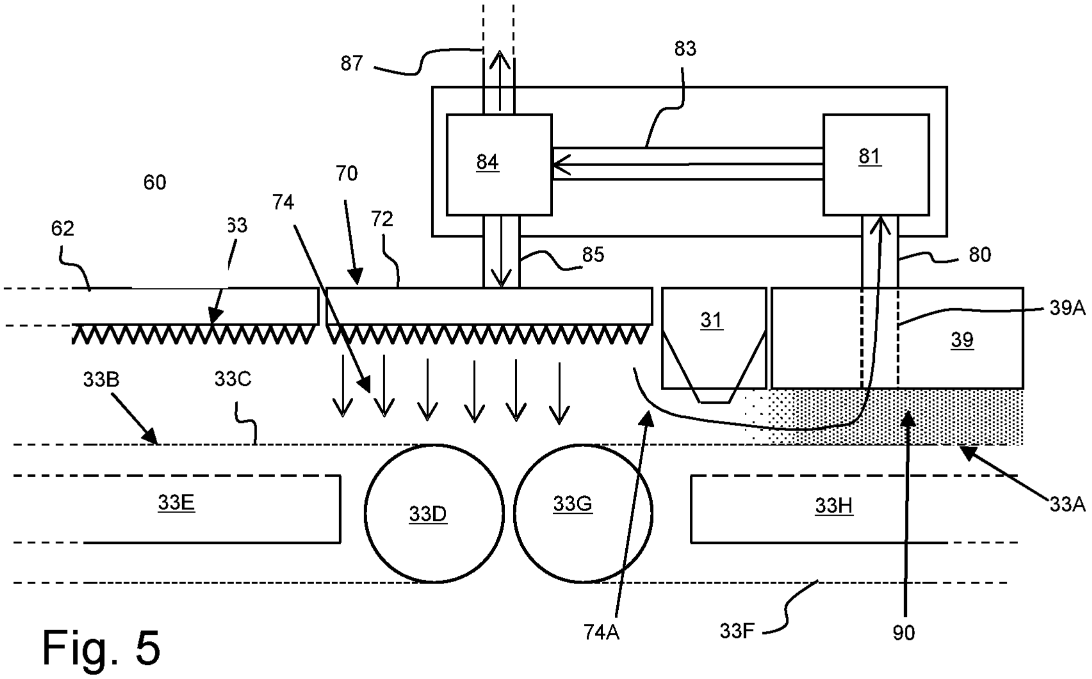
FIG. 5 the enlarged side view of FIG. 2 further indicating the air flows during operation.

FIG. 5 indicates that during operation a fine ink mist 90 is produced by the jetting of the print heads. The ink mist 90 is most prominent between the print station 39 and the upstream conveyor 33A. The print station 39 and/or its surroundings may be provided with suction channels 39A for at least partially removing the ink mist 90. Air from below the print station 39 is drawn into the channel 39A by means of the suction system 81. The suction system further comprises a filter 84, which substantially removes ink particulates from the air passing through it. This allows the filtered air to be vented to the ambient or outside via the vent channel 87. A portion of the ink mist 90 however is transported in the transport direction X due to diffusion and/or convection. Should ink mist particulates reach the detector 31, then these particulates may partially cover the detector 31, which in turn may lead to incorrect operation of the detector 31.

The air knife assembly 70 is provided with filtered air from the filter 84 via channel 85, which is also used for cleaning the air drawn in from below the print station 39. Different sources of air may be applied, such as clean ambient air or a different gas supplied from a different source, such as a pressurized line or container. Connecting the filter 84 and suction source 81 to both the air knife assembly 70 and the print station 39 however results in a compact and low cost embodiment, as shown in FIG. 5. The air knife assembly 70 is positioned sufficiently close to the detector 31 and the channel 39A of the print station 39, such that at least a portion 74A of the air jetted from the air knife assembly 70 is directed towards the print station 39. This portion 74A flows upstream against the transport direction X over the upstream conveyor 33A and below the detector 31. The flow 74A is selected to be sufficiently large to prevent the ink mist from reaching the detector 31, thus keeping the detector 31 clean and fully operational.

A sufficiently large and/or strong flow 74A for pushing back the ink mist 90 from the detector 31 may be formed by an appropriate configuration of the respective components. The flow 74A may be increased by closely positioning the air knife assembly 70, detector 31, and print station 39 with respect to one another. The air knife assembly 70 may be configured to blow a portion of its jetted air towards and/or underneath the detector 31. The air flow 84A is further dependent on the power of the suction source 81 as well the dimensions of the channels 39A, 80, 83, 85. Shielding may be provided around the detector 31 and/or air knife assembly 70 to direct the air flow 74A. The skilled person will take into consideration that the air flow underneath the print station 39 should not excessively disturb the positioning of the jetted droplets and/or will compensate for this by other means, such as adjusting the timing of the jetting of the droplets.

It will be appreciated that the embodiment in the FIG. 5 illustrates a compact and low-costs variant of the present invention. It will be clear to the skilled person that the longitudinal air knife forming unit 71, 72 may be provided with pressurized air or any other type of gas from a different source than the suction source 81 with filter 84 of the print station 39. Likewise, the air flow 74 may be generated with a different blower than the air knife assembly 70, for example a dedicated laterally extending blower positioned at the upstream side of the detector 31. The 'clean' air for generating the air flow 74A need not be supplied by the suction source 81 with filter 84 of the print station, but from a different source, such as a dedicated pump or pressurized gas line or container. The term air knife forming unit and air blower are utilized as illustrative terms as commonly applied in the respective technical field and it will be obvious to the skilled person that the term air may include different gases, such as nitrogen.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, such a reference to a structural element encompasses a computer readable medium carrying such computer executable instructions.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A sheet printer comprising:

an upstream sheet conveyor;

a downstream sheet conveyor adjacent to the upstream sheet conveyor in a transport direction of a sheet to define a transfer region, wherein the sheet is transferred between the upstream conveyor and the downstream conveyor; and an air knife assembly positioned at the transfer region so as to overlap the transfer region for emitting an air current to control the landing of an edge of said sheet on the downstream conveyor, wherein the air knife assembly is configured for emitting an air curtain formed such that said air curtain and air currents resulting from said air curtain flow substantially perpendicular to said transport direction, wherein the air knife assembly emits the air current towards the sheet, towards the upstream sheet conveyor and towards the downstream sheet conveyor, wherein each of the upstream sheet conveyor and the downstream sheet conveyor include an endless transport belt, and wherein the air knife assembly is configured for emitting the air curtain which extends substantially longitudinal in said transport direction.

2. The sheet printer according to claim 1, wherein said air knife assembly is configured for emitting at least two laterally spaced apart air curtains, the at least two laterally spaced apart air curtains being longitudinal in said transport direction.

3. The sheet printer according to claim 1, wherein said air knife assembly comprises a first elongated air knife forming unit extending longitudinally in said transport direction.

4. The sheet printer according to claim 3, wherein a length of the first elongated air knife forming unit in the transport direction exceeds a width thereof in the lateral direction.

5. The sheet printer according to claim 3, wherein the first air knife forming unit is formed of a first row of nozzles extending substantially in said transport direction.

6. The sheet printer according to claim 5, wherein said air knife assembly further includes a second air knife forming unit formed of a second row of nozzles extending substantially in said transport direction.

7. The sheet printer according to claim 6, wherein the first row of nozzles and the second row of nozzles are angled with respect to an out-of-plane direction of a sheet support surface of the upstream sheet conveyor and the downstream sheet conveyor, and wherein the first row of nozzles is angled towards a first lateral edge of the sheet and the second row of nozzles is angle towards a second lateral edge of the sheet, the first lateral edge of the sheet being opposite to the second lateral edge of the sheet.

8. The sheet printer according to claim 7, wherein the first row of nozzles and the second row of nozzles are symmetric about a height direction.

9. The sheet printer according to claim 1, wherein the air knife assembly extends from and over an upstream end of the downstream sheet conveyor to and over a downstream end of the upstream sheet conveyor.

10. The sheet printer according to claim 1, wherein a sheet drying station is positioned over the downstream sheet conveyor, said drying station comprising an air blower for supplying pressurized air, wherein the air knife assembly is supplied by said air blower.

11. The sheet printer according to claim 10, wherein the drying station comprises an impingement dryer, the impingement dryer comprising a plurality of nozzles emitting high velocity air jets, and wherein the impingement dryer extends towards the transfer region.

12. The sheet printer according to claim 1, wherein the endless transport belts of the upstream sheet conveyor and the downstream sheet conveyor are air-permeable endless belts that are positioned over a suction chamber through which an underpressure is applicable for holding sheets against said endless belt.

13. The sheet printer according to claim 1, further comprising a controller for controlling the air knife assembly to emit the air current timed to an arrival of the sheet in the transfer region.

14. The sheet printer according to claim 1, wherein the air knife assembly is positioned over and faces a sheet support surface of the upstream sheet conveyor and the downstream sheet conveyor.

15. A method for transferring a sheet using the sheet printer according to claim 1, the method comprising:

applying an air current to the sheet as the sheet is transferred between the upstream sheet conveyor and the downstream sheet conveyor, the air current being substantially longitudinal in the transport direction of the upstream sheet conveyor and the downstream sheet conveyor.

16. The method according to claim 15, wherein the air current is the air curtain, a length of the air curtain in the transport direction of one and/or both of the upstream sheet conveyor and the downstream sheet conveyor greatly exceeding a width thereof in a lateral direction of said one and/or both of the upstream sheet conveyor and the downstream sheet conveyor.

17. The method according to claim 16, wherein at least a majority of the air current flows in the lateral direction before and after contacting the sheet and/or one or both of the upstream sheet conveyor and the downstream sheet conveyor.

18. The method according to claim 17, wherein the air current is emitted in the lateral and downward directions, such that air flow in the longitudinal direction before and after contacting the sheet and/or one or both of the upstream sheet conveyor and the downstream sheet conveyor is substantially prevented.

19. The sheet printer according to claim 1, wherein the sheet is transferred directly between the belts of the upstream sheet conveyor and the downstream sheet conveyor, without an intermediate stationary surface.

20. The sheet printer according to claim 1, wherein the air knife assembly overlaps the upstream sheet conveyor in a height direction, and wherein the air knife assembly overlaps the downstream sheet conveyor in the height direction.

* * * * *